(No Model.) 2 Sheets—Sheet 1.
F. TRUMP.
LAWN MOWER.
No. 303,240. Patented Aug. 5, 1884.
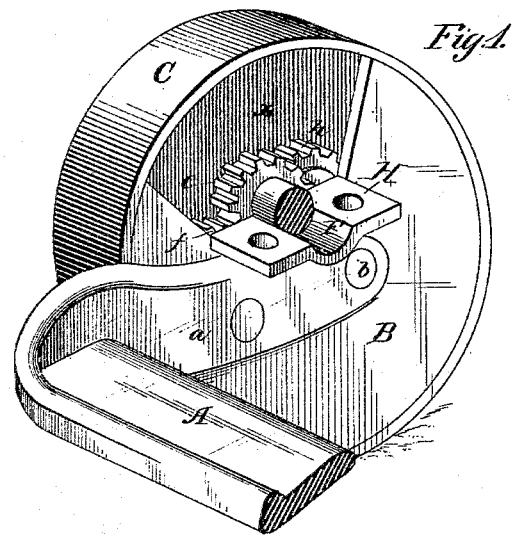
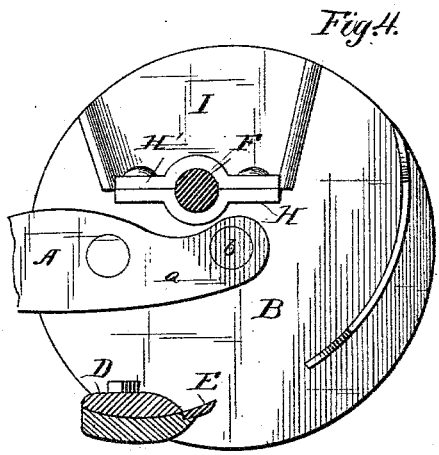
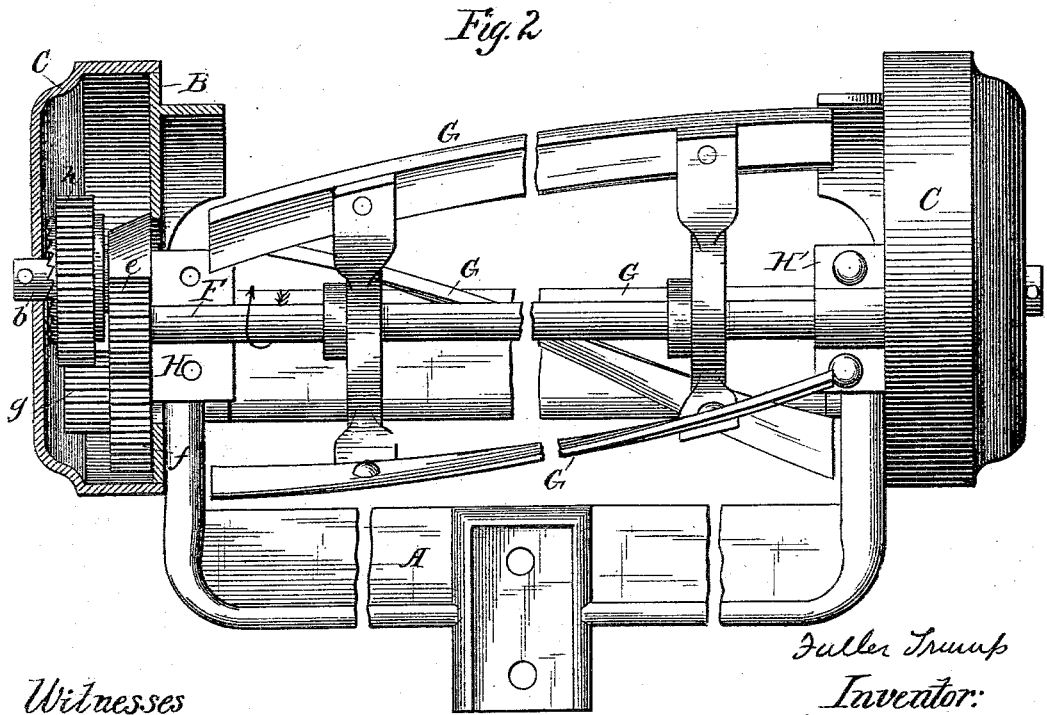
Witnesses
John G. Hinkel
H. F. Sayers
Fuller Trump
Inventor:
By Foster & Freeman
Attys (No Model.) 2 Sheets—Sheet 2.
F. TRUMP.
LAWN MOWER.
No. 303,240. Patented Aug. 5, 1884.
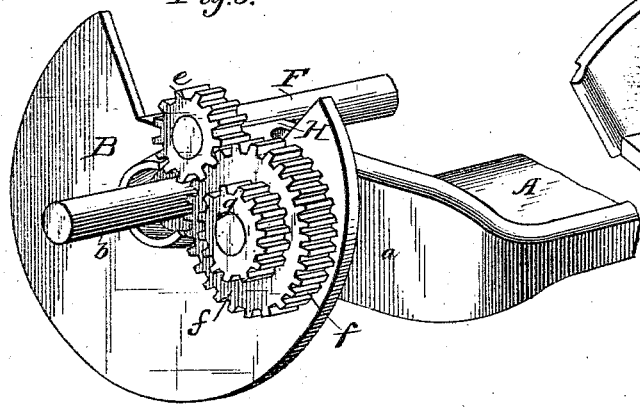
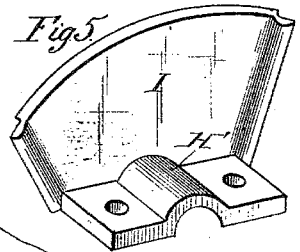
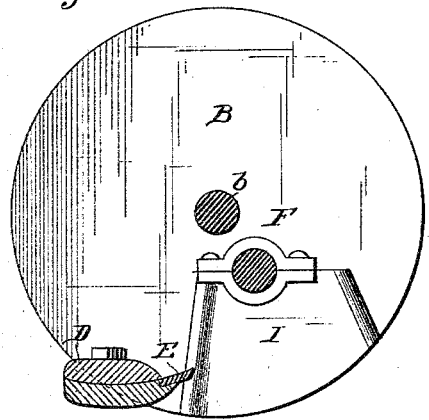
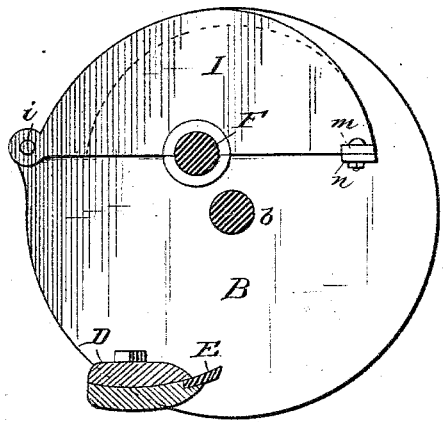
Witnesses:
John G. Hinkel
Wm. J. Sayers
Fuller Trump
Inventor:
By Porter & Freeman
attys

UNITED STATES PATENT OFFICE.

FULLER TRUMP, OF SPRINGFIELD, OHIO.

LAWN-MOWER.

SPECIFICATION forming part of Letters Patent No. 303,240, dated August 5, 1884.

Application filed May 29, 1884. (No model.) Patented in Canada June 16, 1884, No. 19,579.

*To all whom it may concern:*

Be it known that I, FULLER TRUMP, a citizen of the United States, residing at Springfield, in the county of Clark and State of Ohio, have invented certain new and useful Improvements in Lawn-Mowers, of which the following is a specification.

My invention relates to that class of lawn-mowers in which the gears for driving the cutter-shaft are inclosed between the flanged driving-wheels and inside disks; and my invention consists in constructing the parts, as fully described hereinafter, so as to permit the cutter-shaft to be detached from and placed in its bearings without disconnecting any of the working parts of the machine or removing the pinions from the cutter-shaft.

In the drawings, Figure 1 is a perspective view showing one of the wheels and part of the cross-bar of a lawn-mower, and illustrating my improvement. Fig. 2 is a plan view partly in section; Fig. 3, a perspective view showing one of the disks, the gears adjacent thereto, and part of a cutter-shaft and the cross-bar; Fig. 4, a sectional elevation of a machine; Fig. 5, a detached view of a cover-plate and bearing-cap. Figs. 6 and 7 are modifications.

A represents the cross-bar of the machine, provided with lateral arms $a$, each of which is secured to or forms part of a circular disk, B, and upon a pin, $b$, extending centrally through the disk and through each arm $a$, turns a flanged cap or box wheel, C, the rim of which incloses the disk B. The cutter-bar D extends between and connects the two disks B B, and supports the usual detachable cutter or knife, E, and a shaft, F, carries the revolving cutter G, and extends through each of the disks B, and has at each end a pinion, $e$, which gears with a cog-wheel, $f$, connected to a pinion, $g$, driven by a cog-wheel, $h$, that turns with the flanged wheel C when the machine is pushed forward.

The parts described above are to be found in lawn-mowers heretofore constructed, the gears being inclosed between the flanged wheels and the disks, the latter serving to prevent the cuttings from passing to the gears and clogging the latter and impeding the working of the machine. In such mowers it is difficult to put the parts together, and the shafts F can only be disconnected or taken from their bearings by first removing one of the pinions $e$, which necessitates a dismemberment of the machine, and as such removal is frequently necessary the usual construction is objectionable. To overcome these objections I cut away each of the disks B in such manner that the shaft F, with its pinions, may, when the cutaway portion is removed, be placed directly in or taken from its bearings, thereby enabling me to fit the parts with facility and perform any operations that may be required upon the shaft or the parts connected thereto, without interfering with the arrangement and connection of any of the other parts of the machine. One mode of effecting this is illustrated in the drawings, and consists in forming the lower bearing-plate, H, in one piece with or connecting it to the arm $a$, or to the disk B, which is cut away above, below, or at one side of said bearing-piece to form a recess or opening, $x$, these two recesses in the opposite disks B B being of such size that the shaft, with its pinions, may be passed readily through the same, so as to lift it from or place it in the bearings H and the pinions in gear with the cog-wheels $f$ without disconnecting any other parts or removing the pinions. The shaft is retained in connection with the bearing-plates by cap-pieces H', which are bolted to the bearing-plates H, and in order to prevent the cut grass from jamming the gears I close each opening $x$ by means of a plate, I, which is preferably connected to the cap-piece H', so as to be secured in place by the act of bolting the cap-piece to the lower plate, H, of the bearing.

The plate I, instead of being wholly detachable from the disk B, is in some cases pivoted thereto by a pivot, $i$, as shown in Fig. 7, so as to swing to one side and uncover the opening, coinciding lugs $m$ $n$ upon the disk and plate being connected by a bolt to hold the plate and cap-piece in place; or the plate I is arranged in any other manner to cover or guard the opening $x$ and prevent the entrance of cuttings. In Fig. 6 the opening is shown as being below the bearing-piece H, the cap-piece constituting the lower part of the bearing. By thus providing means for detaching the cutter-shaft without removing the pinions or displacing any other parts of the machine, I greatly reduce the difficulties incident to the construction and use of the machine and increase its efficiency.

Without limiting myself to the precise construction and arrangement of parts shown, I claim—

1. In a lawn-mower, the combination of the flanged wheels, the disks forming with said wheels boxes inclosing the driving-gear, means whereby the opposite disks are rigidly connected together, a cutter-shaft provided with pinions driven by gears from said wheels and having bearings on said disks, openings through the disks adjacent to said bearings, and closing-plates adapted to said openings, substantially as described.

2. In a lawn-mower, the combination of the disks connected together, the flanged wheels, the cutter-shaft provided with pinions, the driving-gears inclosed in said wheels outside of the disks, and the openings through the disks permitting the ends of the shaft, with the attached pinions, to be placed in and removed from the bearings, substantially as set forth.

3. A lawn-mower having flanged wheels and disks inclosing the driving-gear, in combination with a cutter-shaft, bearings for said shaft connected with said disks, and openings through the disks, whereby the shaft may be placed in and lifted from said bearings without disturbing the remaining gear, substantially as described.

4. In a lawn-mower, the combination, with a cutter-shaft having pinions thereon, of the flanged driving-wheels, the inclosing-disks, and end bearings for said shaft rigidly connected together, all constructed and arranged in such a manner that the cutter-shaft and pinions may be removed without disturbing the remaining gear, substantially as described.

In testimony whereof I have signed my name to this specification in the presence of two subscribing witnesses.

FULLER TRUMP.

Witnesses:
F. L. FREEMAN,
L. C. YOUNG.